UNITED STATES PATENT OFFICE.

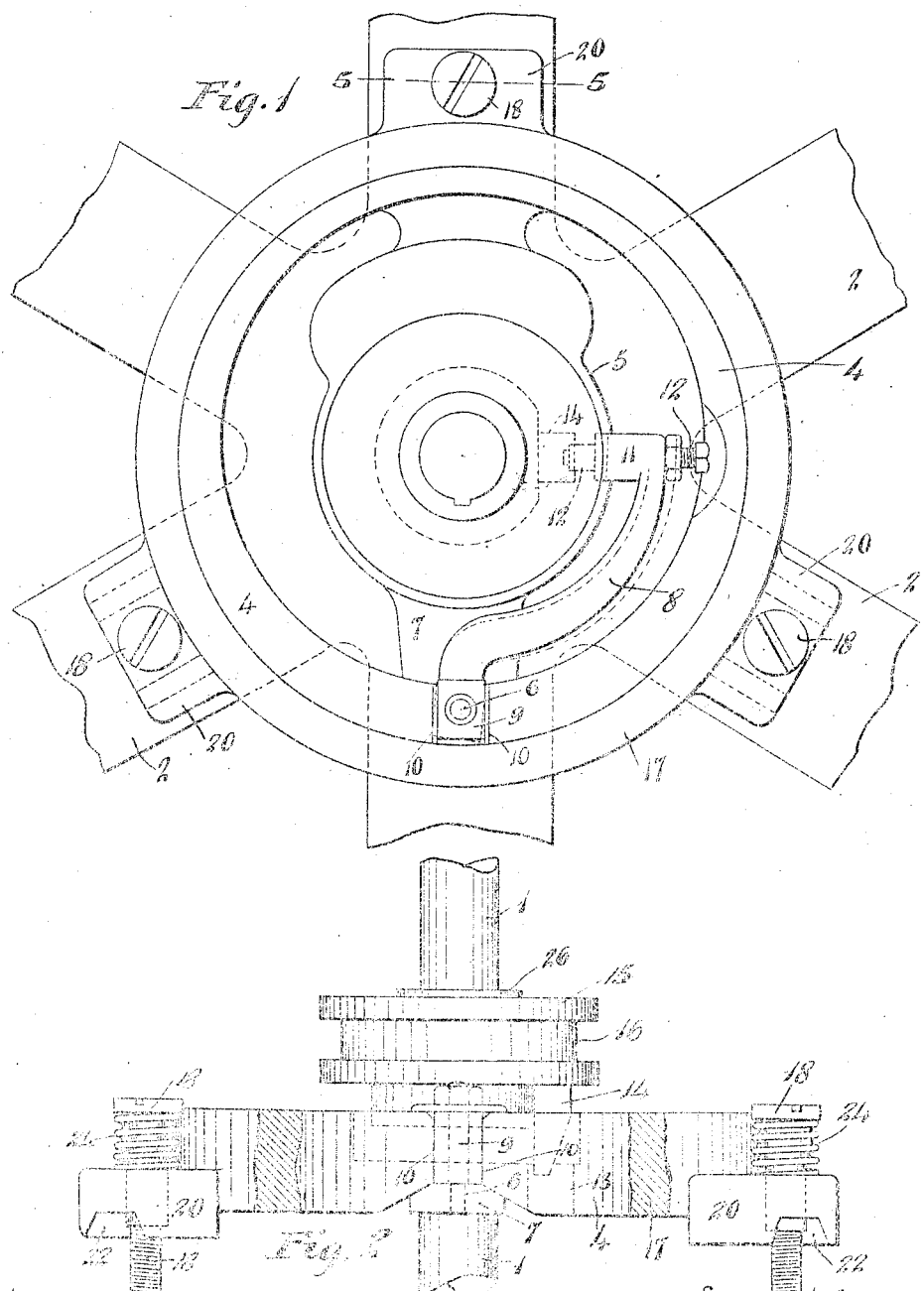

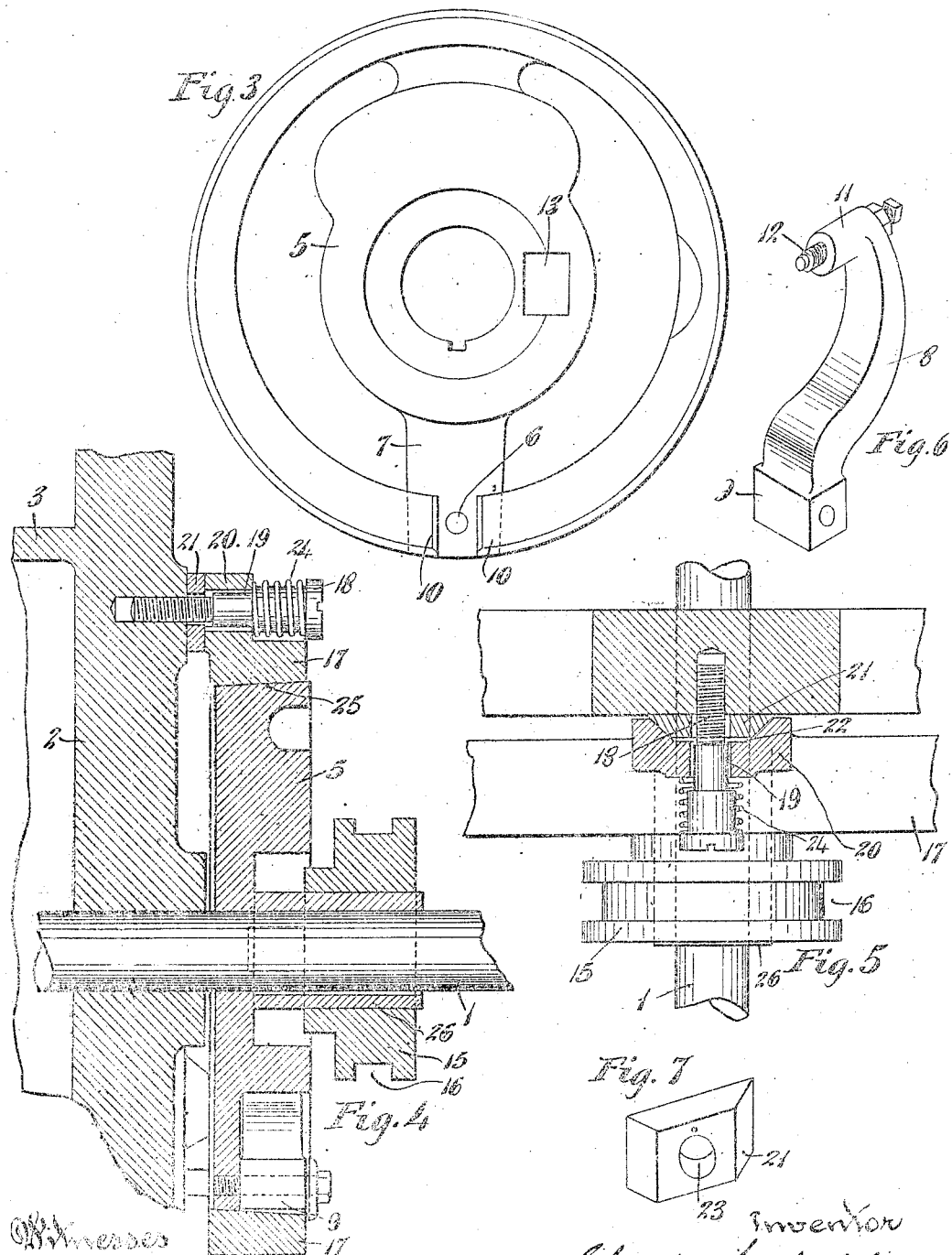

CHARLES SEYBOLD, OF DAYTON, OHIO.

FRICTION-CLUTCH.

1,047,313.　　　　Specification of Letters Patent.　　Patented Dec. 17, 1912.

Application filed May 8, 1911. Serial No. 625,812.

*To all whom it may concern:*

Be it known that I, CHARLES SEYBOLD, a citizen of the United States, and a resident of the city of Dayton, in the county of Montgomery and State of Ohio, have invented certain new and useful Improvements in Friction-Clutches, of which the following is a full, clear, and exact description, reference being had to the accompanying drawings, forming part of this specification.

My invention relates to friction clutches and friction couplings in which rotatable driving and driven members are provided, with means for bringing the two members into frictional engagement to couple the driving member to the shaft to be driven, and more particularly to such couplings and clutches in which the driven member is tight on the shaft to be driven, with the driving member loose thereon, with means to cause frictional engagement of the driving member with the member to be driven. Such friction clutches are ordinarily subjected to great and excessive wear, when not properly adjusted, and to maintain the proper clutch very frequent adjustment is required. When the two members of such a clutch engage properly the wear is of course reduced to a minimum, for while in engagement there is no wear on the friction surfaces. It is the slipping of the clutch caused by changes in load that subjects the clutch to its most excessive wear.

It is the object of my invention to provide a construction in which this liability of slippage with increase of load is avoided, and with which the frictional engagement of the parts is automatically enhanced as the load is increased.

I have illustrated my invention with particular reference to a type of friction clutch in which a split ring on one member is expanded within a hub band on the other member to enforce the frictional engagement of the driving and the driven mechanism, but it will be understood that my invention is equally applicable to other forms of friction clutches and that many modifications of the particular construction illustrated may be made without departing from the spirit of my invention, as hereinafter set forth and claimed, which in its essentials consists of means for driving the driving member of the clutch which, as the load increases, shall shift the driving member into closer and more powerful frictional contact with the driven member.

In the drawings, Figure 1 is a front elevation of my improved friction clutch. Fig. 2 is a side elevation of same, partly in section. Fig. 3 is a front elevation of the split ring or driven member of the clutch. Fig. 4 is a central vertical section of the clutch construction, as illustrated in Fig. 1. Fig. 5 is a transverse section through one of the attaching lugs, taken on the line 5, 5, of Fig. 1. Fig. 6 is a perspective view of the lever for expanding the split ring. Fig. 7 is a perspective view of one of the driving wedges for the driving member of the clutch.

In the drawings I have illustrated my invention with the clutch applied for connecting the driving power to the driving shaft of the machine in which the driving pulley and fly wheel are loosely mounted on the driving shaft of the machine, and the friction clutch is applied between the fly wheel and pulley and the driving shaft to drive the machine mechanism when the clutch is thrown into action.

In this construction, 1 is the driving shaft of the machine upon which is loosely mounted the fly wheel, only the spokes 2 of which are shown, and the portion of the section of the rim of the driving pulley connected with the fly wheel is indicated at 3.

Keyed to the driving shaft 1 of the machine is a split ring or expansion band 4, provided with an integral hub portion 5, by means of which it is keyed on the shaft. Mounted on the pin 6, projecting from an extension 7 of the hub portion of the expansion band, is a lever 8 formed with the block 9, which is fitted between the ends 10 of the expansion band, so that the rocking of this lever 8 on the pin 6 will expand the band. The inwardly extending arm of this lever is provided with a head 11, in which is mounted a set screw 12, which projects into a recess 13 in the hub 5 of the band, and this pin is arranged to be engaged by a beveled pin 14, projecting inwardly from the face of a sliding collar 15 mounted on the sleeve 26 of the hub 5 of the expansion band, and arranged to be shifted in the ordinary way by a starting lever, the bifurcated end of which engages within the groove 16 in the sliding collar, so that the shifting of the sliding collar will rock the lever 8 and expand the band 4. This band is expanded within an annular rim 17, which rim is in turn secured to the fly wheel, so that by the expansion of the band 4, a clutch will be formed between the driving parts and the parts of the machine to be driven.

In the older constructions, the rim within which the split ring is expanded has either been an integral part of the driving wheel, or when loosely mounted thereon, as shown in my prior patents 667,798, of February 12, 1901, and 757,236, of April 12, 1904, no provision was made to allow the rim and split ring to shift laterally with reference to each other to affect the frictional engagement of the parts.

In my present construction, the rim 17 is secured to the spokes of the fly wheel by screw studs 18, which are passed through apertures 19 in the projecting lugs 20 of the rim 17, and are screwed into the spokes. Three of these lugs symmetrically disposed on the periphery of the rim 17 are all that I have found necessary, although, of course, the rim may be attached to each of the spokes, if desired. These apertures in the rim, through which the studs are passed, are of slightly greater diameter than the diameter of the studs, and they are also slotted slightly in the direction of the periphery of the rim, in order to permit some movement between the studs and the rim as hereinafter described.

Interposed between the lugs 20 and the attaching surface of the driving wheel, I arrange for each lug a wedge plate 21, through which the stud passes, and the lugs on their contacting faces are provided with correspondingly wedge shaped or beveled recesses 22, to receive these wedges. In order that the surfaces of the wedges shall adjust themselves to the beveled surfaces of the lug recesses in the radial movement of the parts, the opening 23 in the wedge plates are slightly larger in diameter than the diameter of the stud, so that there is looseness of fit. If the contacting wedged or beveled surfaces of the parts were cut on radial lines, it would not be necessary to mount the wedge plates 21 loosely on the studs, and they could be an integral part of the driving wheel structure, or secured tightly on the stud; but inasmuch as for conyenience of manufacture, I prefer to cut these surfaces on parallel lines, I mount them loosely, as described.

Interposed between the heads of the studs 18 and the lugs 20, is a coiled spring 24, which tends to hold the rim 17 against the surface of the driving wheel.

The contacting surface of the split ring 4 is formed slightly cone shaped as indicated at 25 in Fig. 4, and a corresponding surface of the rim 17 is also formed with a cone surface, so that the split ring and the rim have a conical fit, and any movement of the rim 17 toward the split ring on an axial line will tend to additionally tighten the two parts over the frictional contact obtained by expanding the ring within the rim.

With this construction, the operation will be as follows: Let the parts be adjusted so that sufficient expansion will be had for the ring to frictionally engage the rim and clutch the parts together for the coupling up of the shaft 1 with the driving power, without load. Under these circumstances, the clutch connection will be made in the usual way. The moment the load is applied to the shaft 1 and through it to the expansion ring and rim 17, this will tend to retard the rotary movement of the rim, while the driving wheel is running at its full speed. Inasmuch as the connection between the rim and the driving wheel is made through the studs and the studs have a slight slotted engagement with the lugs on the rim, under the above conditions the wedges 21 will bear on the beveled faces of the recesses in their respective lugs, and this action will cause the rim 17 to move away from the face of the driving wheel, and the rim 17 and split ring 4 will be forced together, and as the engagement surfaces are cone shaped, this will tighten automatically the frictional engagement between the two clutch members.

It will be evident that the heavier the load applied to the machine driven by the shaft 1, the more tightly will the cone surfaces be driven together, so that the clutch will automatically adjust itself to any load applied. In this way, when the clutch is once adjusted for a free running connection, the clutch automatically tightens as the load is applied, so that slippage is reduced to a minimum, and consequently the wear is correspondingly reduced, and the life of the clutch correspondingly prolonged.

As previously stated, it will be evident that my construction can be applied to various forms of friction clutches and that the details of the construction can be very materially changed without departing from the spirit of my invention. It will also be evident that either member of the clutch may, in any instance, comprise the driven member, and the other member the driving member. It is immaterial, of course, and the parts will operate in the same way, if the shaft with the expansion band is employed to couple up and drive the pulley, or fly wheel, or the parts are arranged with the fly wheel or driving member.

Having thus described my invention, what I claim as new and desire to secure by Letters Patent, is:—

1. In a friction clutch, a rotary driving member and a rotary driven member, said members comprising a rim band and an expansion ring, with means for expanding the ring to cause frictional engagement, with cone-shaped contacting surfaces for the band and the ring, with means interposed between the driving member and the driving power, to cause the driving member to shift on its axis of rotation to automatically force the two members into closer engagement with the retard of the driven member upon an increase of load.

2. In a friction clutch, a rotary driving member and a rotary driven member, said members comprising a rim band and an expansion ring respectively, with cone shaped contacting surfaces for frictional engagement, with bevel contact devices interposed between the driving member and the driving power to cause the driving member to shift on its axis of rotation to automatically force the two members into closer engagement with the retard of the driven member upon an increase of load.

3. In a friction clutch, a rotary driving member and a rotary driven member, said members comprising a rim band and an expansion ring respectively, with cone shaped contacting surfaces for frictional engagement, a driving wheel with means for connecting the driving wheel to the driving member, with wedges attached to the driving wheel, and beveled recesses in the rim band for engagement with the wedges, whereby with the retard of the expansion ring the rim band will be shifted longitudinally to force the clutch members into closer engagement.

4. In a friction clutch, a rotary driving member and a rotary driven member, said members comprising a rim band and an expansion ring respectively, with cone shaped contacting surfaces for frictional engagement, a driving wheel to which the rim band is loosely secured, with wedges attached to the driving wheel, and beveled recesses in the rim band for engagement with the wedges, whereby upon increase of load, to retard the rotation of the expansion ring, the wedges will shift the rim band into closer engagement with the expansion ring.

5. In a friction clutch, a rotary driving member and a rotary driven member, said members comprising a rim band and an expansion ring respectively, a driving wheel to which the rim band is loosely secured, with wedges attached to the driving wheel, and beveled recesses in the rim band for engagement with the wedges, whereby upon increase of load to retard the movement of the expansion ring, the wedges will shift the rim band into closer engagement with the expansion ring, with springs to return the rim band to normal position upon the decrease of the load.

CHARLES SEYBOLD.

Attest:
  FRANK H. HERBST,
  O. A. STUHLDREHER.